United States Patent
Yarbrough et al.

(10) Patent No.: US 10,563,636 B2
(45) Date of Patent: Feb. 18, 2020

(54) JOINT ASSEMBLY FOR A WIND TURBINE ROTOR BLADE

(71) Applicant: General Electric Company, Schenectady, NY (US)

(72) Inventors: Aaron A. Yarbrough, Greenville, SC (US); Christopher Daniel Caruso, Greenville, SC (US); Scott Jacob Huth, Greenville, SC (US); Andrew Mitchell Rodwell, Greenville, SC (US)

(73) Assignee: General Electric Company, Schenectady, NY (US)

( * ) Notice: Subject to any disclaimer, the term of this patent is extended or adjusted under 35 U.S.C. 154(b) by 191 days.

(21) Appl. No.: 15/670,102

(22) Filed: Aug. 7, 2017

(65) Prior Publication Data

US 2019/0040842 A1 Feb. 7, 2019

(51) Int. Cl.
*F03D 1/06* (2006.01)
(52) U.S. Cl.
CPC .................. *F03D 1/0675* (2013.01)
(58) Field of Classification Search
CPC .... F03D 1/0683; F03D 1/0633; F03D 1/0641; F03D 1/0658; F03D 1/0675
(Continued)

(56) References Cited

U.S. PATENT DOCUMENTS 2,456,007 A   12/1948  Marsilius
2,503,450 A    4/1950  Nebesar
(Continued)

FOREIGN PATENT DOCUMENTS

DE   102014118004 B3   3/2016
EP        1808598 A1   7/2007
(Continued)

OTHER PUBLICATIONS www.wind-energy-the-facts.org/enpart-i-technology/chapter-3-wind-turbine-technology/current-developments (Abstract Only).
(Continued)

*Primary Examiner* — Joseph J Dallo
*Assistant Examiner* — Scott A Reinbold
(74) *Attorney, Agent, or Firm* — Dority & Manning, P.A.

(57) ABSTRACT

A joint assembly for joining rotor blade segments of a wind turbine rotor blade includes a female structural member secured within a first rotor blade segment. The female structural member includes first bore holes on opposing sides thereof that are aligned in a chord-wise direction. Further, the joint assembly includes a male structural member extending longitudinally from an end face of a second rotor blade segment. As such, the male structural member is received within the female structural member of the first rotor blade segment such that the first and second rotor blade segments are aligned and connected. The male structural member includes second bore holes on opposing sides thereof. Further, the second bore holes are aligned with the first bore holes. Moreover, the joint assembly includes at least one chord-wise extending pin extending through the first and second bore holes so as to join the first and second rotor blade segments. In addition, the male structural member has a height that increases from a blade root of the rotor blade towards the at least one chord-wise extending pin.

18 Claims, 7 Drawing Sheets (58) Field of Classification Search
CPC .............. Y02P 70/523; F02B 2240/302; F02B 2240/301; F05B 2230/604; F05B 2240/302
USPC ........................................................ 416/223
See application file for complete search history.

(56) References Cited

U.S. PATENT DOCUMENTS

| | | | |
|---|---|---|---|
| 2,981,337 | A | 4/1961 | Stuart, III |
| 3,013,614 | A | 12/1961 | Platt |
| 3,771,748 | A | 11/1973 | Jones |
| 4,079,903 | A | 3/1978 | Ashton et al. |
| 4,130,380 | A | 12/1978 | Kaiser |
| 4,643,646 | A | 2/1987 | Hahn et al. |
| 4,671,470 | A | 6/1987 | Jonas |
| 4,883,407 | A | 11/1989 | Touze |
| 4,895,491 | A | 1/1990 | Cross et al. |
| 5,127,802 | A | 7/1992 | Carlson et al. |
| 5,476,704 | A | 12/1995 | Kohler |
| 6,234,423 | B1 | 5/2001 | Hirahara et al. |
| 6,287,079 | B1 | 9/2001 | Gosling et al. |
| 6,513,757 | B1 | 2/2003 | Amaoka et al. |
| 6,520,706 | B1 | 2/2003 | McKague, Jr. et al. |
| 6,800,956 | B2 | 10/2004 | Bartlett |
| 6,945,727 | B2 | 9/2005 | Christman et al. |
| 6,964,723 | B2 | 11/2005 | Lindsay et al. |
| 7,037,568 | B1 | 5/2006 | Rogers et al. |
| 7,179,059 | B2 | 2/2007 | Sorensen et al. |
| 7,186,086 | B2 | 3/2007 | Yoshida |
| 7,244,487 | B2 | 7/2007 | Brantley et al. |
| 7,258,828 | B2 | 8/2007 | Fish |
| 7,334,989 | B2 | 2/2008 | Arelt |
| 7,371,304 | B2 | 5/2008 | Christman et al. |
| 7,381,029 | B2 | 6/2008 | Moroz |
| 7,393,184 | B2 | 7/2008 | Cairo |
| 7,393,488 | B2 | 7/2008 | Grose et al. |
| 7,427,189 | B2 | 9/2008 | Eyb |
| 7,470,114 | B2 | 12/2008 | Bonnet |
| 7,625,623 | B2 | 12/2009 | Grose et al. |
| 7,654,799 | B2 | 2/2010 | Eyb |
| 7,810,757 | B2 | 10/2010 | Kirkwood et al. |
| 7,841,835 | B2 | 11/2010 | Bagepalli et al. |
| 7,854,594 | B2 | 12/2010 | Judge |
| 7,891,947 | B2 | 2/2011 | Chen et al. |
| 7,897,095 | B2 | 3/2011 | Raeckers |
| 7,901,188 | B2 | 3/2011 | Gonzalez et al. |
| 7,922,454 | B1 * | 4/2011 | Riddell ................. F03D 1/0675 416/224 |
| 7,976,282 | B2 | 7/2011 | Livingston et al. |
| 7,997,874 | B2 | 8/2011 | van der Bos |
| 8,075,275 | B2 | 12/2011 | Althoff et al. |
| 8,142,157 | B2 | 3/2012 | Kita et al. |
| 8,167,569 | B2 | 5/2012 | Livingston |
| 8,172,538 | B2 | 5/2012 | Hancock et al. |
| 8,221,085 | B2 | 7/2012 | Livingston et al. |
| 8,317,483 | B2 | 11/2012 | Gerber et al. |
| 8,376,713 | B2 | 2/2013 | Kawasetsu et al. |
| 8,393,871 | B2 | 3/2013 | Yarbrough |
| 8,449,259 | B1 | 5/2013 | Kaser |
| 8,510,947 | B2 | 8/2013 | Kirkpatrick et al. |
| 8,517,689 | B2 | 8/2013 | Kyriakides et al. |
| 8,562,296 | B2 | 10/2013 | Arocena De La Rua et al. |
| 8,777,573 | B2 | 7/2014 | Hibbard et al. |
| 8,896,980 | B2 | 11/2014 | Kristensen et al. |
| 9,051,921 | B2 | 6/2015 | Arocena De La Rua et al. |
| 9,371,817 | B2 | 6/2016 | Olthoff |
| 9,388,789 | B2 | 7/2016 | Hibbard et al. |
| 2003/0037867 | A1 | 2/2003 | Bersuch et al. |
| 2003/0138290 | A1 | 7/2003 | Wobben |
| 2006/0225278 | A1 | 10/2006 | Lin et al. |
| 2007/0036659 | A1 | 2/2007 | Hibbard |
| 2007/0110584 | A1 | 5/2007 | Stommel |
| 2007/0122283 | A1 | 5/2007 | Wobben |
| 2007/0253824 | A1 | 11/2007 | Eyb |
| 2008/0069699 | A1 | 3/2008 | Bech |
| 2008/0145231 | A1 | 6/2008 | Gonzales et al. |
| 2008/0175682 | A1 | 7/2008 | Musil et al. |
| 2008/0181781 | A1 | 7/2008 | Livingston et al. |
| 2008/0310964 | A1 | 12/2008 | Gonzalez et al. |
| 2009/0087318 | A1 | 4/2009 | Althoff et al. |
| 2009/0155084 | A1 | 6/2009 | Livingston et al. |
| 2009/0162206 | A1 | 6/2009 | Zirin et al. |
| 2009/0169323 | A1 | 7/2009 | Livingston |
| 2009/0196755 | A1 | 8/2009 | Peace et al. |
| 2009/0208341 | A1 | 8/2009 | Gonzalez et al. |
| 2009/0208701 | A1 | 8/2009 | Grose et al. |
| 2010/0132884 | A1 | 6/2010 | Bachmann et al. |
| 2010/0135815 | A1 | 6/2010 | Bagepalli et al. |
| 2010/0135817 | A1 | 6/2010 | Wirt et al. |
| 2010/0143143 | A1 | 6/2010 | Judge |
| 2010/0162567 | A1 | 7/2010 | Kirkwood et al. |
| 2011/0008175 | A1 | 1/2011 | Gau |
| 2011/0020126 | A1 | 1/2011 | Glenn et al. |
| 2011/0052403 | A1 | 3/2011 | Kawasetsu et al. |
| 2011/0081247 | A1 | 4/2011 | Hibbard |
| 2011/0081248 | A1 | 4/2011 | Hibbard |
| 2011/0091236 | A1 | 4/2011 | Oi et al. |
| 2011/0091326 | A1 | 4/2011 | Hancock |
| 2011/0110789 | A1 | 5/2011 | Luebbe |
| 2011/0142663 | A1 | 6/2011 | Gill |
| 2011/0142667 | A1 | 6/2011 | Miebach et al. |
| 2011/0142675 | A1 | 6/2011 | van der Bos |
| 2011/0176928 | A1 | 7/2011 | Jensen |
| 2011/0243736 | A1 | 10/2011 | Bell |
| 2011/0293432 | A1 | 12/2011 | Hibbard et al. |
| 2012/0027594 | A1 | 2/2012 | Lewke et al. |
| 2012/0027610 | A1 | 2/2012 | Yarbrough |
| 2012/0027613 | A1 | 2/2012 | Yarbrough |
| 2012/0027614 | A1 | 2/2012 | Yarbrough |
| 2012/0027615 | A1 | 2/2012 | Irizarry-Rosado et al. |
| 2012/0141287 | A1 | 6/2012 | Hynum et al. |
| 2012/0269643 | A1 | 10/2012 | Hibbard et al. |
| 2015/0240780 | A1 | 8/2015 | Leonard et al. |
| 2015/0292477 | A1 * | 10/2015 | Kratmann ............. F03D 1/0633 416/229 R |
| 2015/0369211 | A1 * | 12/2015 | Merzhaeuser ........ F03D 1/0675 416/61 |
| 2016/0163415 | A1 | 6/2016 | Wallenius et al. |
| 2016/0298608 | A1 | 10/2016 | Whitehouse et al. |

FOREIGN PATENT DOCUMENTS

| | | |
|---|---|---|
| EP | 1761702 B1 | 11/2011 |
| EP | 2390498 A1 | 11/2011 |
| EP | 2288807 B1 | 9/2013 |
| EP | 2 679 806 A1 | 1/2014 |
| WO | WO0146582 A2 | 6/2001 |
| WO | WO2005/064156 A1 | 7/2005 |
| WO | WO2006064077 A1 | 6/2006 |
| WO | WO2009/130467 A2 | 10/2009 |
| WO | WO2009/135902 A2 | 11/2009 |
| WO | WO2009/155920 A1 | 12/2009 |
| WO | WO2011/070137 A1 | 6/2011 |

OTHER PUBLICATIONS

U.S. Appl. No. 15/602,698, filed May 23, 2017.
International Search Report and Written Opinion issued in connection with corresponding PCT Application No. PCT/US2018/045476 dated Nov. 27, 2018.

* cited by examiner

JOINT ASSEMBLY FOR A WIND TURBINE ROTOR BLADE

FIELD

The present invention relates generally to wind turbine rotor blades, and more particularly to joint assemblies for wind turbine rotor blades.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles and transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The construction of a modern rotor blade generally includes skin or shell components, spar caps, and one or more shear webs extending between opposing spar caps. The skin, typically manufactured from layers of fiber composite and a lightweight core material, forms the exterior aerodynamic airfoil shape of the rotor blade. Further, the spar caps provide increased rotor blade strength by integrating one or more structural elements running along the length of the rotor blade on both interior sides of the rotor blade. The shear web(s) includes structural beam-like components running essentially perpendicular between the top and bottom spar caps and extend across the interior portion of the rotor blade between the outer skins. The spar caps have typically been constructed from glass fiber reinforced composites, though some larger blades may include spar caps constructed from carbon fiber reinforced composites.

The size, shape, and weight of rotor blades are factors that contribute to energy efficiencies of wind turbines. An increase in rotor blade size increases the energy production of a wind turbine, while a decrease in weight also furthers the efficiency of a wind turbine. Furthermore, as the size of wind turbines increases, particularly the size of the rotor blades, so do the respective costs of manufacturing, transporting, and assembly of the wind turbines. The economic benefits of increased wind turbine sizes must be weighed against these factors.

One known strategy for reducing the costs of pre-forming, transporting, and erecting wind turbines having rotor blades of increasing sizes is to manufacture the rotor blades in blade segments. The blade segments may be assembled to form the rotor blade after, for example, the individual blade segments are transported to an erection location. For example, some rotor blades include either bonded or bolted joints. One such bolted joint includes a chord-wise extending pin securing a male shear web member or spar member within a female shear web member so as to join adjacent blade segments.

However, certain issues are associated with the chord-wise extending pin. For example, the edge loading of the joint without pin contact is indeterminate. Further, it is challenging to provide a suitable joint within the limited space of the airfoil. In addition, the connections between blade segments are difficult to complete in the field. Moreover, fitting structural materials into the airfoil shape to support the loads but also being able to assemble the joint can be problematic. Still further issues include with segmented rotor blades includes maximizing the structural efficiency of the joint structure and while also maintaining the joint mass as low as possible.

Thus, there is a need for a joint assembly for a segmented rotor blade that addresses the aforementioned issues. Accordingly, the present disclosure is directed to a joint assembly for wind turbine rotor blades having a locally increased height of the male shear web member at the location of the chord-wise extending pin.

BRIEF DESCRIPTION

The present invention provides an improved wind turbine rotor blade design that addresses the considerations discussed above. Additional aspects and advantages of the invention may be set forth in part in the following description, or may be obvious from the description, or may be learned through practice of the invention.

In one aspect, the present disclosure is directed to a segmented rotor blade for a wind turbine. The rotor blade includes a first rotor blade segment having a female structural member with first bore holes on opposing sides thereof that are aligned in a chord-wise direction. The rotor blade also includes a second rotor blade segment having a male structural member extending therefrom and through the female structural member such that the first and second rotor blade segments are aligned and connected. Further, the male structural member includes second bore holes on opposing sides thereof that are aligned with the first bore holes. The rotor blade also includes at least one chord-wise extending pin extending through the first and second bore holes so as to join the first and second rotor blade segments together. In addition, the male structural member has a height that increases from a blade root of the rotor blade towards the at least one chord-wise extending pin.

In one embodiment, the height increases to a maximum height at the at least one chord-wise extending pin. In another embodiment, the rotor blade includes at least one gap defined between an outer side surface of the male structural member and an inner side surface of the female structural member. In such embodiments, the maximum height of the male structural member closes the gap at the chord-wise extending pin. In certain embodiments, the height of the male structural member decreases from the maximum height towards a blade tip of the rotor blade.

In further embodiments, the rotor blade further includes at least one span-wise extending pin extending through either or both of the male and female structural members so as to secure the plurality of rotor blade segments to a root ring of the rotor blade.

In additional embodiments, the male structural member contacts the female structural member only at the at least one span-wise extending pin and the at least one chord-wise extending pin. In several embodiments, the rotor blade may further include at least one bushing for receiving each of the at least one span-wise extending pin and the at least one chord-wise extending pin.

In another aspect, the present disclosure is directed to a joint assembly for joining a plurality of rotor blade segments of a rotor blade of a wind turbine. The joint assembly includes a female structural member secured within a first rotor blade segment. The female structural member includes first bore holes on opposing sides thereof that are aligned in a chord-wise direction. Further, the joint assembly includes a male structural member extending longitudinally from an end face of a second rotor blade segment. As such, the male structural member is received within the female structural member of the first rotor blade segment such that the first and second rotor blade segments are aligned and connected. The male structural member includes second bore holes on opposing sides thereof. Further, the second bore holes are aligned with the first bore holes. Moreover, the joint assembly includes at least one chord-wise extending pin extending through the first and second bore holes so as to join the first and second rotor blade segments. In addition, the male structural member has a height that increases from a blade root of the rotor blade towards the at least one chord-wise extending pin. It should be understood that the joint assembly may further include any of the additional features and/or embodiments described herein.

In yet another aspect, the present disclosure is directed to a method for joining a plurality of rotor blade segments of a rotor blade. The method includes providing a first rotor blade segment having a female structural member secured therein. The method also includes providing a second rotor blade segment having a male structural member extending therefrom. Further, the male structural member has a height that increases from a blade root of the rotor blade towards an intermediate location. As such, the method includes inserting the male structural member into the female structural member so as to align first bore holes on opposing sides of the female structural member with second bore holes on opposing sides of the male structural member. Moreover, the method includes inserting at least one chord-wise extending pin through the aligned first and second bore holes so as to join the first and second rotor blade segments at a joint.

In one embodiment, the method also includes aligning the intermediate location of the male structural member with the joint. For example, in one embodiment, the intermediate location corresponds to maximum height of the male structural member. It should be understood that the method may further include any of the additional steps, features and/or embodiments described herein.

These and other features, aspects and advantages of the present invention will become better understood with reference to the following description and appended claims. The accompanying drawings, which are incorporated in and constitute a part of this specification, illustrate the embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
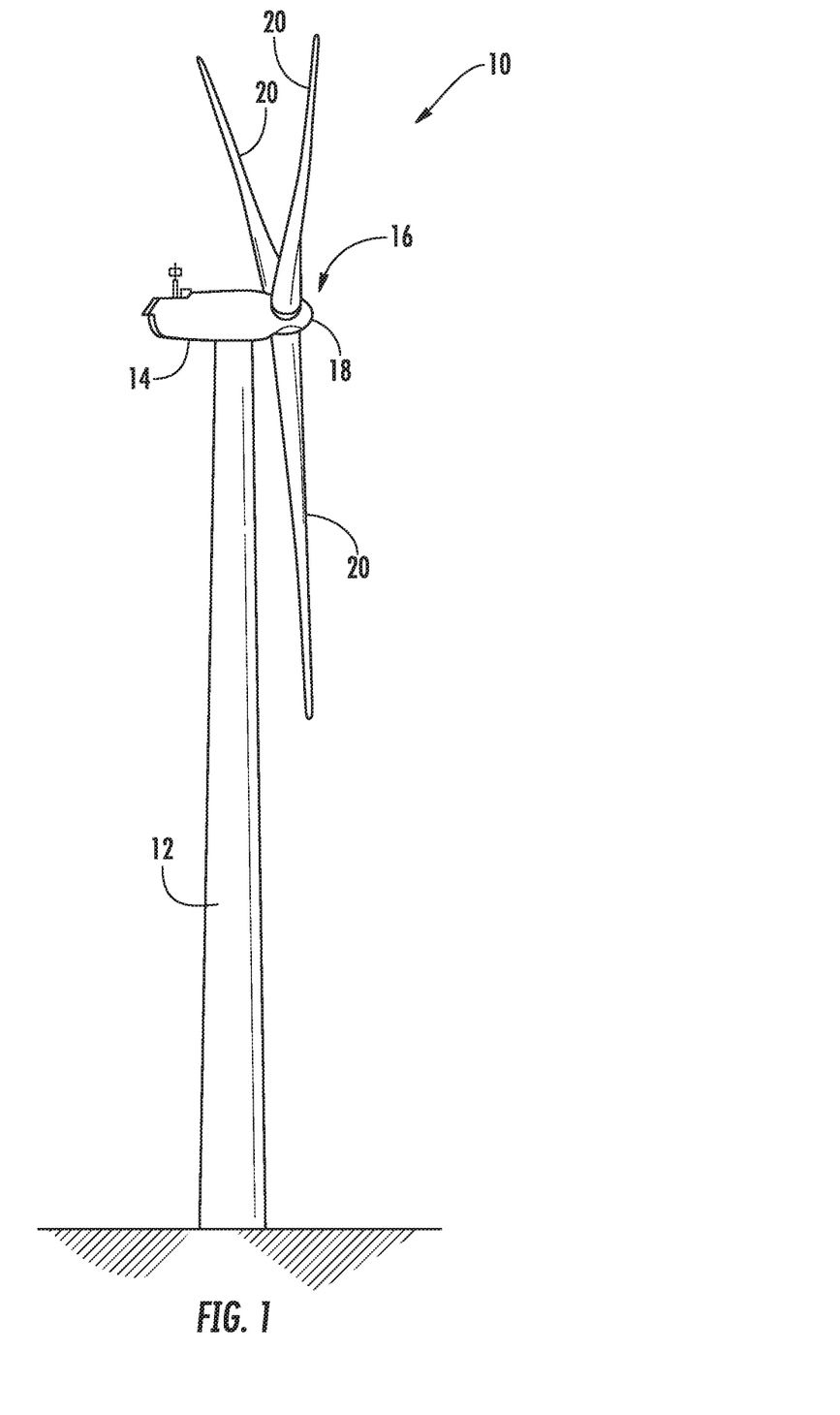
FIG. 1 illustrates a perspective view of one embodiment of a wind turbine according to the present disclosure.

Referring now to the drawings, FIG. 1 illustrates a perspective view of one embodiment of a wind turbine 10. As shown, the wind turbine 10 generally includes a tower 12, a nacelle 14 mounted on the tower 12, and a rotor 16 coupled to the nacelle 14. The rotor 16 includes a rotatable hub 18 and at least one rotor blade 20 coupled to and extending outwardly from the hub 18. For example, in the illustrated embodiment, the rotor 16 includes three rotor blades 20. However, in an alternative embodiment, the rotor 16 may include more or less than three rotor blades 20. Each rotor blade 20 may be spaced about the hub 18 to facilitate rotating the rotor 16 to enable kinetic energy to be transferred from the wind into usable mechanical energy, and subsequently, electrical energy. For instance, the hub 18 may be rotatably coupled to an electric generator (not shown) positioned within the nacelle 14 to permit electrical energy to be produced.

Figure 2:
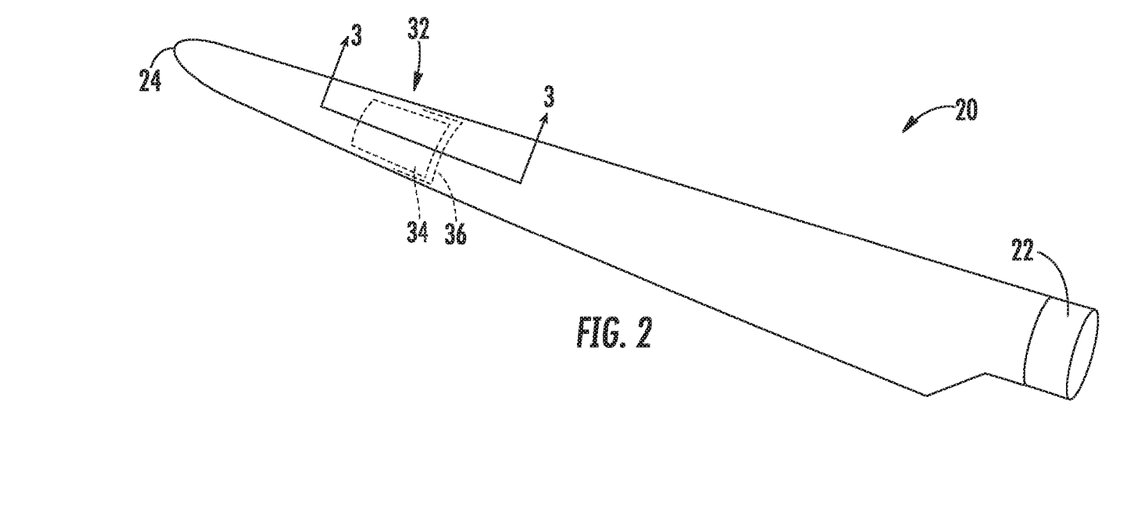
FIG. 2 illustrates a perspective view of one embodiment of a segmented rotor blade of the wind turbine according to the present disclosure.

Referring now to FIG. 2, a perspective view of one of the rotor blades 20 of the wind turbine 10 of FIG. 1 is illustrated. As shown, the rotor blade 20 includes a blade root 22 which is used to mount the rotor blade 20 to the hub 18 and a blade tip 24 opposite the blade root 22. Further, as shown, the body section of the rotor blade 20 includes a plurality of individual blade segments 25, 26 aligned in an end-to-end order from the blade root 22 to the blade tip 24. More specifically, as shown, the rotor blade 20 includes, at least, a first rotor blade segment 25 and a second rotor blade segment 26. As such, each of the individual blade segments 25, 26 may be uniquely configured so that the plurality of segments 25, 26 define the complete rotor blade 20 having the designed blade profile, length, and other desired characteristics. Thus, the rotor blade 20 may have a swept shape giving it a curved contour running from the blade root 22 to the blade tip 24.

Alternatively, the segmented rotor blade 20 may have a non-swept shape. Further, the longitudinal end faces of the individual blade segments 25, 26 may have a profile so as to align with the end face of an adjacent blade segment.

Figure 4:
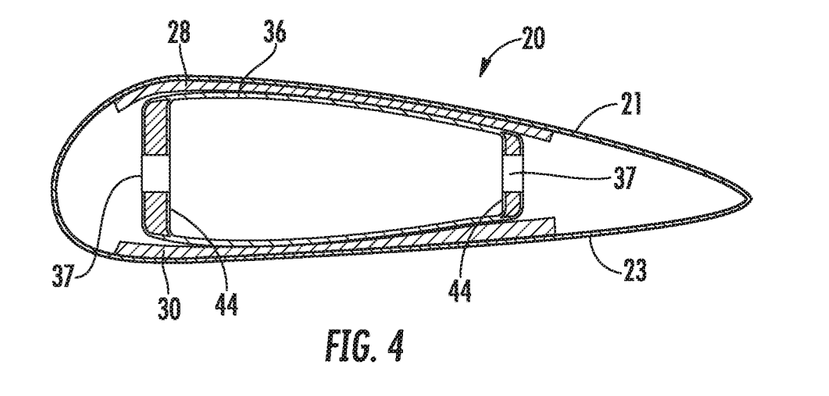
FIG. 4 illustrates a cross-sectional view of one embodiment of a rotor blade segment having a female structural member secured between opposing spar caps of the rotor blade according to the present disclosure.

In addition, as shown in FIG. 4, each of the individual blade segments 25, 26 may be formed from a first shell component 21 and a second shell component 23. Such shell components 21, 23 may be individually formed and joined together at the leading and trailing edges of the rotor blade 20. The individual shell components 21, 23 may each include an inner and outer skin, and may be constructed, for example, from a dry fibrous material. In addition, each of the shell components 21, 23 may include a core material sandwiched between the inner and outer skins. This core material may be, for example, a lightweight material, such as balsa wood, extruded polystyrene foam, or the like, as is known in the art.

Figure 3:
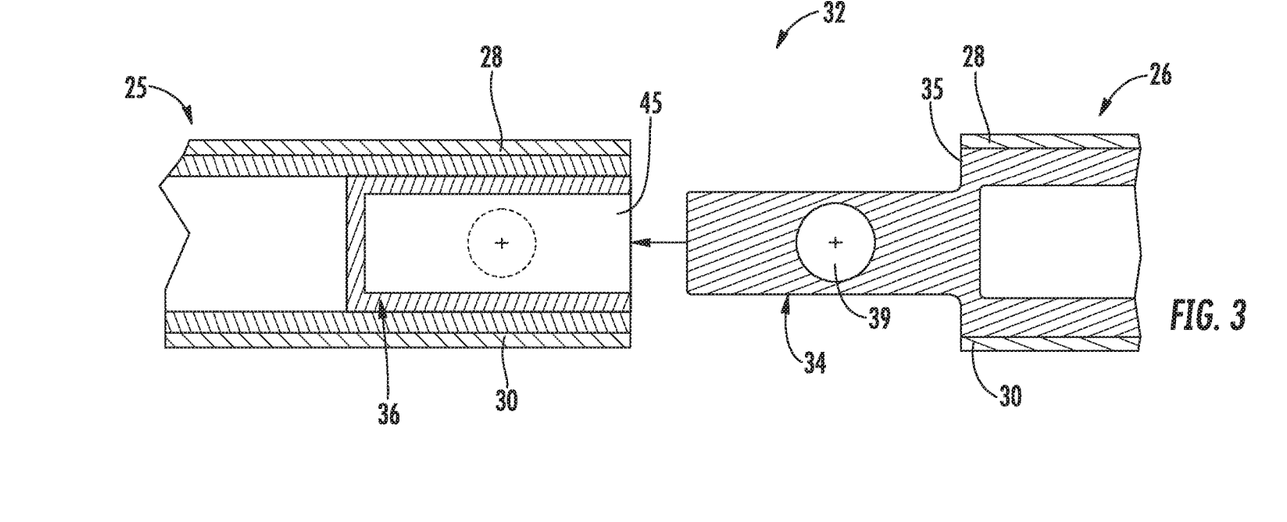
FIG. 3 illustrates a span-wise cross-sectional view of one embodiment of a joint assembly of a segmented rotor blade according to the present disclosure.
Figure 6:
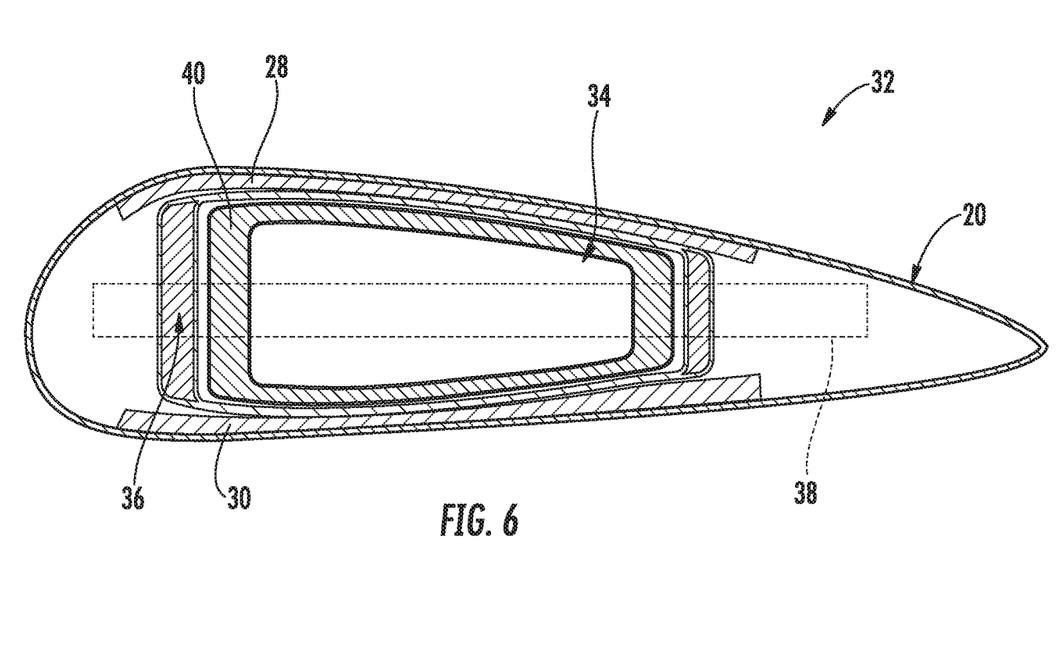
FIG. 6 illustrates a cross-sectional view of one embodiment of the joint assembly according to the present disclosure.

In further embodiments, the rotor blade 22 may also include any manner of internal structural components or other support webs between the upper and lower shell components 21, 23 of the blade segments 25, 26. For example, as shown in FIGS. 3, 4, and 6, the rotor blade 20 may include spar caps 28, 30 extending along substantially the full longitudinal length of the rotor blade 20 and are bonded to an inner skin or surface of the rotor blade 20. Further, as shown, the spar caps 28, 30 may have a shape and curvature that essentially matches the shape and curvature of the internal skins of the respective shell components 21, 23 or any additional internal web adhered to the inner skin surfaces.

Figure 8:
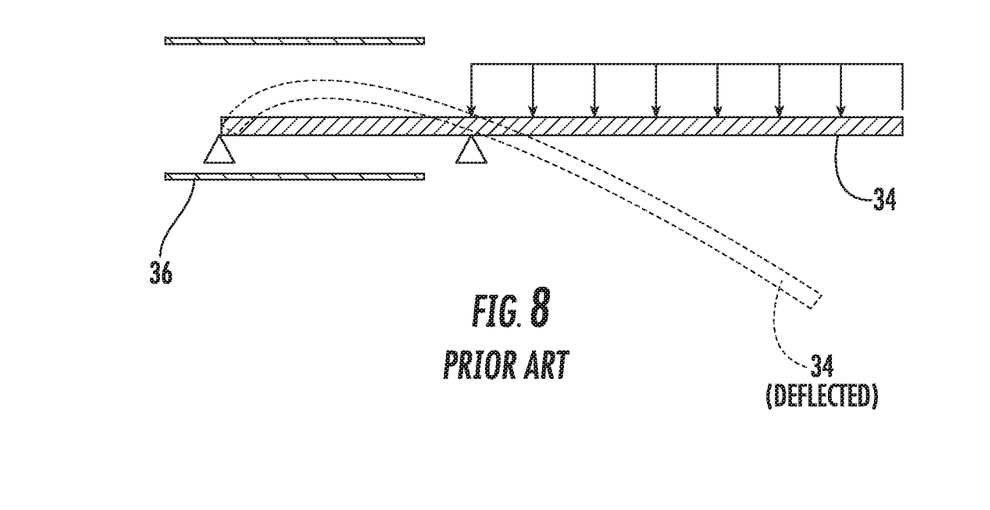
FIG. 8 illustrates a deflection profile of the conventional rotor blade of FIG. 7.

Referring particularly to FIGS. 3, 6, and 8, the rotor blade 20 may also include a joint assembly 32 formed by a longitudinally extending (e.g. span-wise) rigid male structural member 34 that extends through a female structural member 36. For example, in one embodiment, the male structural member 34 may form part of a shear web of the rotor blade 20 as well as part of the spar caps thereof 28, 30. Further, as shown, the female structural member 36 may form part of the shear web as well. Thus, as shown, the joint assembly 32 provides structural integrity to the rotor blade 20 (i.e. by acting as the shear web between opposing spar caps 28, 30) and joins adjacent rotor blade segments 26 together as described herein.

More specifically, as shown in FIG. 3, the first rotor blade segment 25 includes the female structural member 36 therein. Further, as shown in FIGS. 3 and 4, the female structural member 36 defines an internal passageway 45. Moreover, as shown, the female structural member 36 has a certain keyed profile that corresponds or matches the cross-sectional profile of the male structural member 34. In addition, the female structural member 36 may be adhered to the inner skins of the shell components 21, 23 and spar caps 28, 30 using any suitable adhesive material or bonding method. For example, the female structural member 36 may be attached directly to the inner skin surfaces of the shell components 21, 23 or may be attached to a separate web that is adhered to the inner skin surfaces for added support and rigidity. In addition, as shown particularly in FIG. 3, the male structural member 34 extends from an end face 35 the second blade segment 26 and has a particular cross-sectional profile that generally corresponds to the cross-sectional shape of the internal passageway 45 of the female structural member 36.

Figure 5:
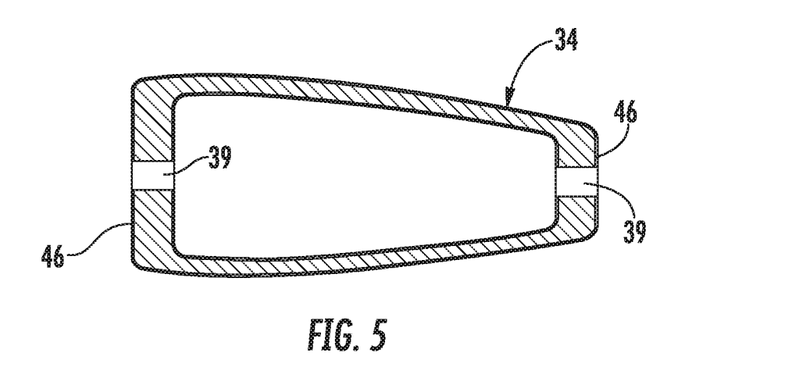
FIG. 5 illustrates a cross-sectional view of one embodiment of male structural member that fits within a female structural member according to the present disclosure.

It should be understood that the male and female structural members 34, 36 may take on various shapes and configurations. For example, as shown generally in FIGS. 3 and 5-6, the male structural member 34 corresponds to a beam-like structure and a hollow box beam structure, respectively. Similarly, as shown in FIGS. 3, 4, and 6, the internal passageway 45 of the female structural member 36 have a generally box-like cross-sectional profile that corresponds to the profile of the male structural member 34. More specifically, as shown, the male structural member 34 may have a hollow square or rectangular configuration, with the spar caps 28, 30 defined by opposite sides of the box beam structure. In alternate embodiments, as shown in FIG. 5, the male structural member 34 may have a hollow beam structure with concave or convex walls extending between the spar caps 28, 30.

The male and female structural members 34, 36 may be formed of any suitable material conventionally used as internal shear webs for wind turbine blades. For example, the male and/or female structural members 34, 36 may be formed of a carbon fiber reinforced matrix or a glass fiber reinforced polymer, or other strong, light-weight material.

Referring now to FIGS. 4 and 6, the female structural member 36 may also include first bore holes 37 on opposing sides thereof. More specifically, as shown, the first bore holes 37 may be aligned in a chord-wise direction. Similarly, as shown in FIGS. 3, 5 and 6, the male structural member 34 includes second bore holes 39 on opposing sides thereof that are aligned with the first bore holes 37.

Further, as shown in FIG. 6, at least one gap 40 is defined between an outer side surface 46 of the male structural member 34 and an inner side surface 44 of the female structural member 36. Moreover, as shown, the joint assembly 32 includes at least chord-wise extending pin 38 extending through the first and second bore holes 37, 39 so as to join the first and second rotor blade segments 25, 26 together at a joint 33.

Referring particularly to FIG. 8, the rotor blade 20 may also include at least one span-wise extending pin 48 extending through either or both of the male and female structural members 34, 36 so as to secure the plurality of rotor blade segments 26 to the root ring 35 of the rotor blade 20. More specifically, as shown, each joint 33 may further include at least one bushing 41 for receiving the span-wise extending pin(s) 48 and the chord-wise extending pin(s) 38.

Figure 7:
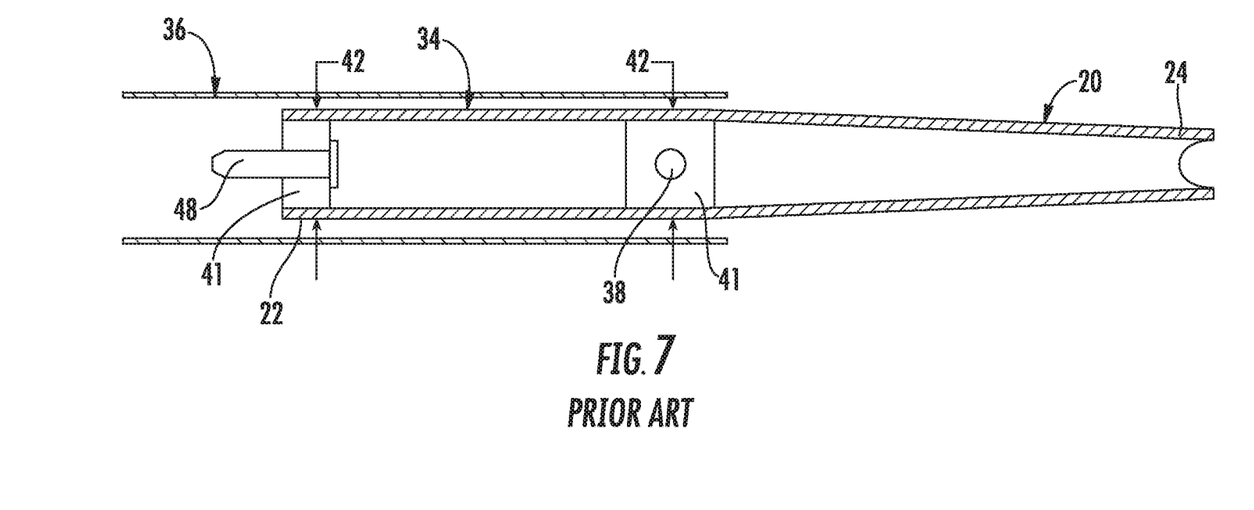
FIG. 7 illustrates a span-wise cross-sectional view of a rotor blade according to the conventional construction, particularly illustrating a male structural member arranged within a female structural member.
Figure 9:
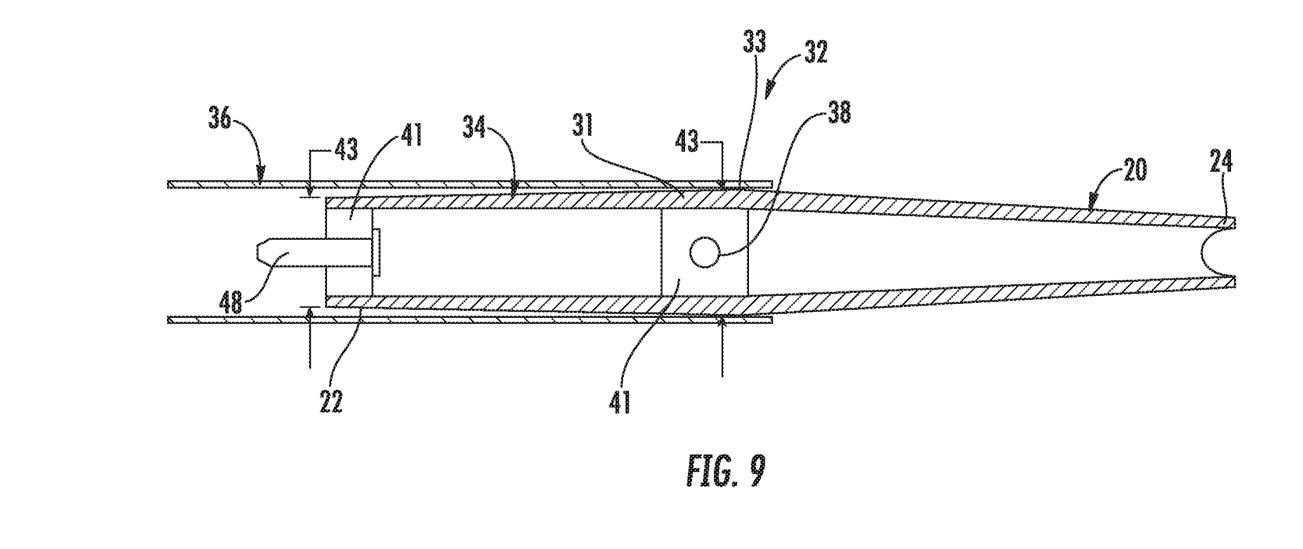
FIG. 9 illustrates a span-wise cross-sectional view of a rotor blade according to the present disclosure, particularly illustrating a male structural member arranged within a female structural member.

Referring now to FIGS. 7 and 9, cross-sectional views of a segmented rotor blade according to conventional construction and according to the present disclosure are illustrated, respectively. As shown in FIG. 7, the male structural member 34 has a constant height from the blade root 22 to the chord-wise extending pin 38. Thus, for conventional joint assemblies, the deflected shape of the male structural member 34 contacts the female structural member 36 between the pins 38, 48, which decrease the clearance at the edges of the bushings 41 for the pins 38, 48.

In contrast, as shown in FIG. 9, the male structural member 34 has a height 43 that increases from the blade root 22 of the rotor blade 20 towards the chord-wise extending pin 38. More specifically, as shown, the height 43 of the male structural member 34 increases to a maximum height at the chord-wise extending pin(s) 38. In such embodiments, as shown, the maximum height of the male structural member 34 closes the gap 40 at the chord-wise extending pin 38. Still referring to FIG. 8, the height 43 of the male structural member 34 of the present disclosure may also decrease from the maximum height at the chord-wise extending pin 38 towards the blade tip 24 of the rotor blade 20.

Due to the localized increase height of the male structural member 34, the male structural member 34 can contact the female structural member 36 only at the locations of the pins

Figure 10:
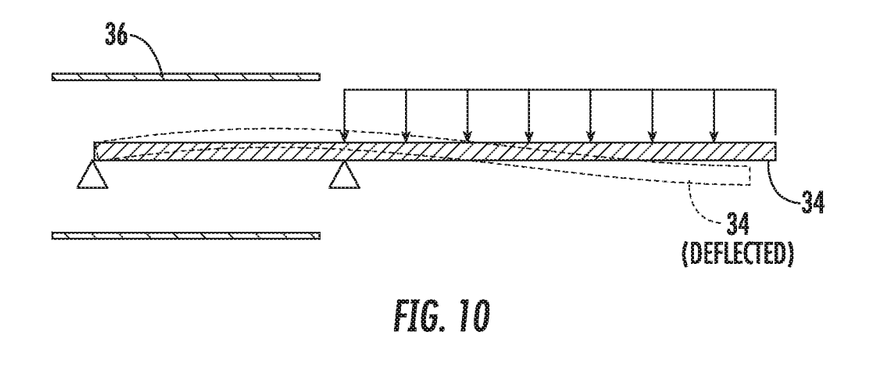
FIG. 10 illustrates a deflection profile of the rotor blade of FIG. 9.

38, 48. In other words, the male structural member 34 can be sized such that its deflected profile (FIG. 10) within the female structural member 36 is small enough that the members 34, 36 do not make contact outside of the pins constraining the members 34, 36 together. Due to the arrangement, however, there is no difference in deflection at the pins 38, 48 between the female structural member 36 and the male structural member 34. This allows the height 43 of the male structural member 34 to increase locally at least at the chord-wise extending pin 38, thereby creating more head-room for the pin 38 to occupy space.

As such, the present disclosure provides many advantages not present in the prior art. For example, the joint assembly 32 of the present disclosure provides increased space for the chord-wise extending pin(s) 38. Further, the male structural member 34 is more efficient for the same amount of material. In addition, the joint assembly 32 of the present disclosure allows for longer blade tips.

Figure 11:
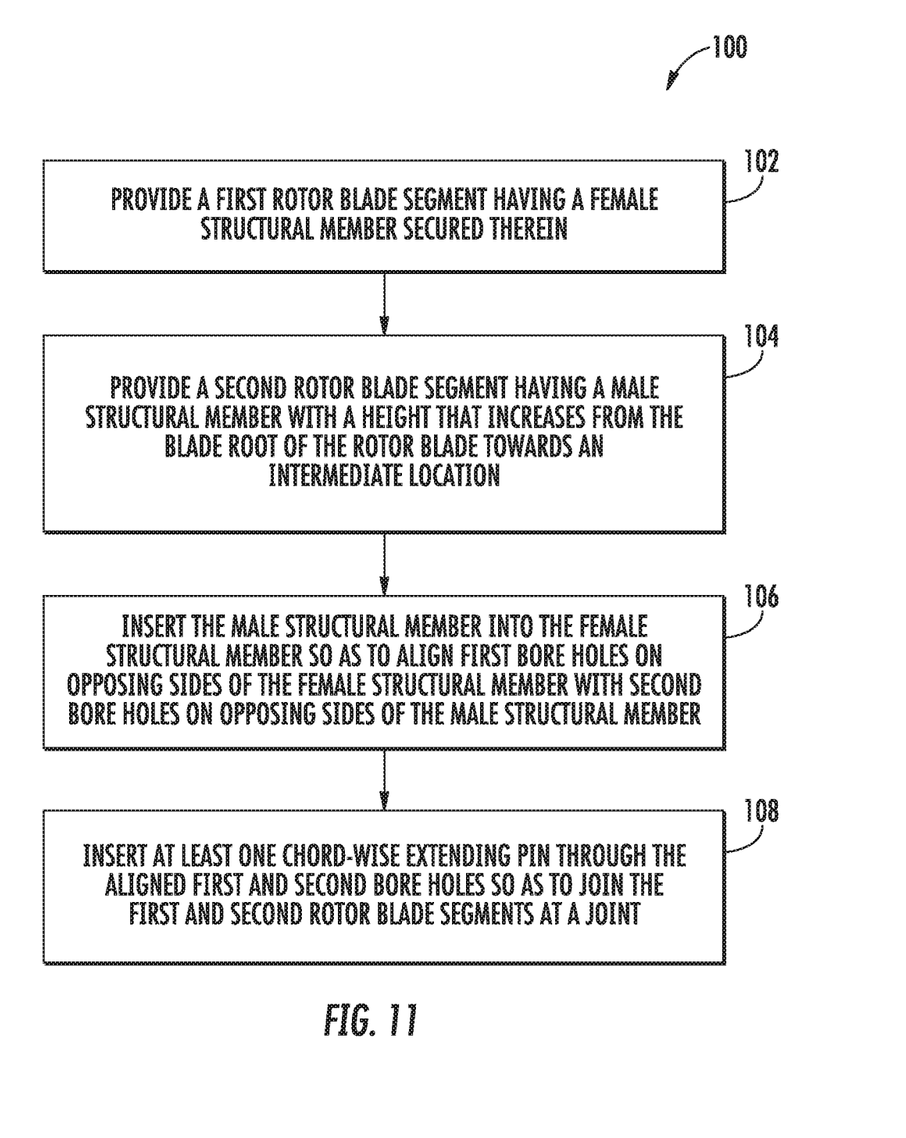
FIG. 11 illustrates a flow diagram of one embodiment of a method for joining a plurality of rotor blade segments according to the present disclosure.

Referring now to FIG. 11, a flow diagram of one embodiment of a method 100 for joining a plurality of rotor blade segments 26 is illustrated. Thus, as shown at 102, the method 100 includes providing a first rotor blade segment 25 having a female structural member 36 secured therein. As shown at 104, the method includes providing a second rotor blade segment 26 having a male structural member 34 having a height 43 that increases from the blade root 22 of the rotor blade 20 towards an intermediate location 31. As shown at 106, the method 100 includes inserting the male structural member 34 into the female structural member 36 so as to align the first bore holes 37 on opposing sides of the female structural member 36 with second bore holes 39 on opposing sides of the male structural member 36. Thus, as shown at 108, the method 100 include inserting at least one chord-wise extending pin 38 through the aligned first and second bore holes 37, 39 so as to join the first and second rotor blade segments 25, 26 at a joint 33.

In one embodiment, the method 100 also includes aligning the intermediate location 31 of the male structural member 34 with the joint 33. For example, as shown in FIG. 8, the intermediate location 31 corresponds to maximum height of the male structural member 34.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A segmented rotor blade for a wind turbine, comprising:
    a first rotor blade segment comprising a female structural member, the female structural member comprising first bore holes on opposing sides thereof, the bore holes aligned in a chord-wise direction;
    a second rotor blade segment comprising a male structural member protruding therefrom, the male structural member comprising a beam structure extending longitudinally through the female structural member such that the first and second rotor blade segments are aligned and connected, the beam structure comprising second bore holes on opposing sides thereof, the second bore holes aligned with the first bore holes; and,
    at least one chord-wise extending pin extending through the first and second bore holes so as to join the first and second rotor blade segments together, the beam structure comprising a span-wise height that increases from a blade root of the rotor blade towards the at least one chord-wise extending pin.

2. The rotor blade of claim 1, wherein the span-wise height increases to a maximum span-wise height at the at least one chord-wise extending pin.

3. The rotor blade of claim 2, further comprising at least one gap defined between an outer side surface of the beam structure and an inner side surface of the female structural member, wherein the maximum span-wise height of the beam structure closes the gap at the chord-wise extending pin.

4. The rotor blade of claim 2, wherein the span-wise height of the beam structure decreases from the maximum span-wise height towards a blade tip of the rotor blade.

5. The rotor blade of claim 1, further comprising at least one span-wise extending pin extending through at least one of the beam structure or the female structural member so as to secure the plurality of rotor blade segments to a root ring of the rotor blade.

6. The rotor blade of claim 5, wherein the beam structure contacts the female structural member only at locations containing the at least one span-wise extending pin or the at least one chord-wise extending pin.

7. The rotor blade of claim 1, further comprising at least one bushing for receiving each of the at least one span-wise extending pin and the at least one chord-wise extending pin.

8. A joint assembly for joining a plurality of rotor blade segments of a rotor blade of a wind turbine, the joint assembly comprising:
    a female structural member secured within a first rotor blade segment, the female structural member comprising first bore holes on opposing sides thereof, the bore holes aligned in a chord-wise direction,
    a male structural member comprising a beam structure extending longitudinally from an end face of a second rotor blade segment and received within the female structural member of the first rotor blade segment such that the first and second rotor blade segments are aligned and connected, the beam structure comprising second bore holes on opposing sides thereof, the second bore holes aligned with the first bore holes; and,
    at least one chord-wise extending pin extending through the first and second bore holes so as to join the first and second rotor blade segments, the beam structure comprising a span-wise height that increases from a blade root of the rotor blade towards the at least one chord-wise extending pin.

9. The joint assembly of claim 8, wherein the span-wise height increases to a maximum span-wise height at the at least one chord-wise extending pin.

10. The joint assembly of claim 9, further comprising at least one gap defined between an outer side surface of the beam structure and an inner side surface of the female structural member, wherein the maximum span-wise height of the beam structure closes the gap at the chord-wise extending pin.

11. The joint assembly of claim 9, wherein the span-wise height of the beam structure decreases from the maximum span-wise height towards a blade tip of the rotor blade.

12. The joint assembly of claim 8, further comprising at least one span-wise extending pin extending through at least one of the beam structure or the female structural member so as to secure the plurality of rotor blade segments to a root ring of the rotor blade.

13. The joint assembly of claim 12, wherein the beam structure contacts the female structural member only at locations containing the at least one span-wise extending pin or the at least one chord-wise extending pin.

14. The joint assembly of claim 8, further comprising at least one bushing for receiving each of the at least one span-wise extending pin and the at least one chord-wise extending pin.

15. A method for joining a plurality of rotor blade segments of a rotor blade, the method comprising:
  providing a first rotor blade segment having a female structural member secured therein;
  providing a second rotor blade segment having a male structural member comprising a beam structure extending therefrom, the beam structure having a span-wise height that increases from a blade root of the rotor blade towards an intermediate location;
  inserting the beam structure into the female structural member so as to align first bore holes on opposing sides of the female structural member with second bore holes on opposing sides of the beam structure; and,
  inserting at least one chord-wise extending pin through the aligned first and second bore holes so as to join the first and second rotor blade segments at a joint.

16. The method of claim 15, further comprising aligning the intermediate location of the beam structure with the joint, the intermediate location corresponding to maximum span-wise height of the beam structure.

17. The method of claim 16, wherein at least one gap is defined between an outer side surface of the beam structure and an inner side surface of the female structural member, wherein the maximum span-wise height of the beam structure closes the gap at the joint.

18. The method of claim 15, wherein the span-wise height of the beam structure decreases from the maximum span-wise height towards a blade tip of the rotor blade.

* * * * *